United States Patent [19]

Kaneda et al.

[11] 4,456,803
[45] Jun. 26, 1984

[54] METHOD AND APPARATUS FOR MAKING AN ELECTRIC RESISTANCE WELDED TUBE

[75] Inventors: Fumio Kaneda, Hussa; Tadahiro Maeike, Hachioji, both of Japan

[73] Assignees: Nippon Kokan Kabushiki Kaisha; Nichiden Koshuha Kabushiki Kaisha, both of Tokyo, Japan

[21] Appl. No.: 381,782

[22] Filed: May 25, 1982

Related U.S. Application Data

[63] Continuation of Ser. No. 120,866, Feb. 12, 1980, abandoned.

[30] Foreign Application Priority Data

Feb. 26, 1979 [JP] Japan .................. 54-20733

[51] Int. Cl.³ .................. H05B 6/40; B23K 31/06
[52] U.S. Cl. .................. 219/8.5; 219/10.43; 219/10.77; 219/10.79; 219/61.2; 219/110
[58] Field of Search .................. 219/8.5, 9.5, 10.41, 219/10.77, 10.43, 59.1, 61.2, 67, 108, 110, 10.79

[56] References Cited

U.S. PATENT DOCUMENTS

| | | | |
|---|---|---|---|
| 2,139,211 | 12/1938 | Sessions | 219/67 X |
| 2,666,831 | 1/1954 | Seulen et al. | 219/8.5 |
| 2,794,893 | 6/1957 | Crawford | 219/8.5 |
| 2,938,993 | 5/1960 | Rudd | 219/8.5 X |
| 3,004,136 | 10/1961 | Peterson | 219/61.2 X |
| 3,253,112 | 5/1966 | Worden | 219/8.5 |
| 3,482,073 | 12/1969 | Roberts | 219/61.2 |
| 3,573,416 | 4/1971 | Drechsler | 219/8.5 |
| 3,612,809 | 10/1971 | Mohr | 219/61.2 X |
| 3,860,778 | 1/1975 | Rudd et al. | 219/9.5 X |
| 4,197,441 | 4/1980 | Rudd | 219/9.5 |

FOREIGN PATENT DOCUMENTS 53-44449  4/1978  Japan .................. 219/8.5

OTHER PUBLICATIONS

"High Frequency Continuous Seam Welding of Ferrous and Nonferrous Tubing", by Osborn, Jr., The Welding Journal, vol. 35, No. 12, Dec. 1956.

Primary Examiner—B. A. Reynolds
Assistant Examiner—Philip H. Leung
Attorney, Agent, or Firm—Frishauf, Holtz, Goodman & Woodward

[57] ABSTRACT

A conductor is installed along a Vee-angle part of a tube to be welded for producing an electric welded tube by high frequency resistance or induction welding. The conductor is set closely above the Vee-angle part. A high-frequency current having about the same phase as a phase of a high-frequency current for welding is supplied to the conductor. This controls the distribution of the current density on mating surfaces of Vee-angle part so that the welding current does not concentrate in the upper and lower edges of the tube, thus making uniform the current density and heating in the Vee-angle part.

25 Claims, 19 Drawing Figures

FIG._1
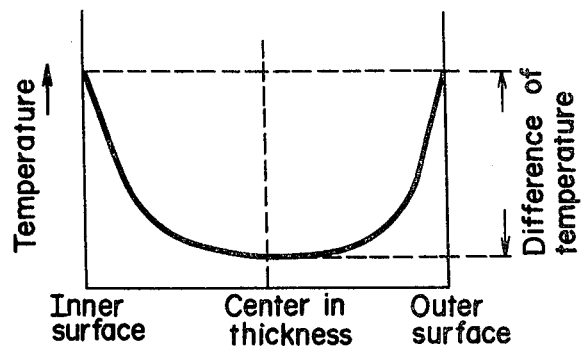
FIG._2
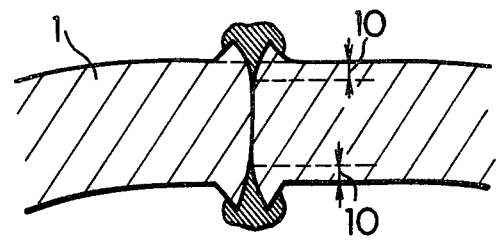
FIG._3
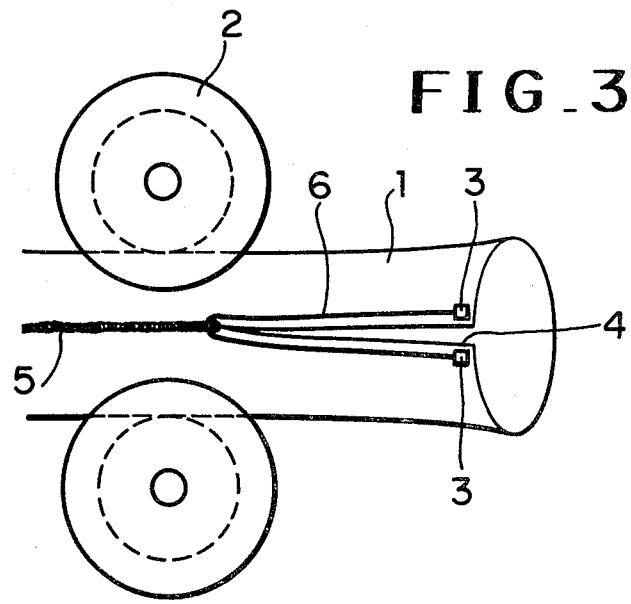

PRIOR ART
F I G. 4A
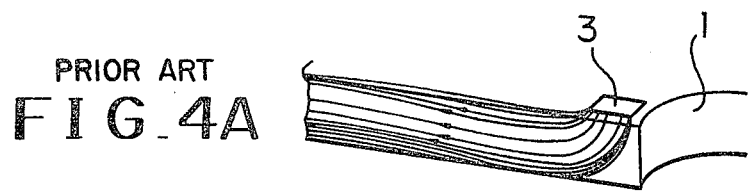
F I G. 4B
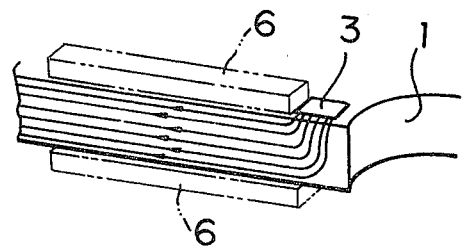
F I G. 5
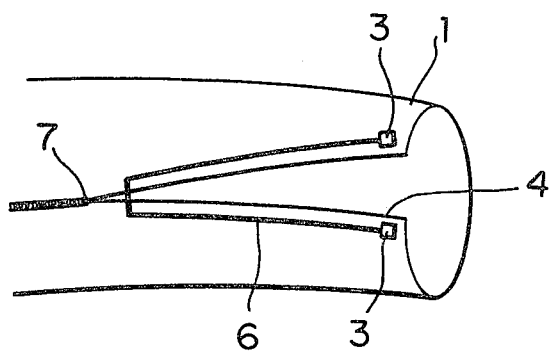
F I G. 6A    $0 \leq \Delta\theta < 90°$
$\Delta\theta = 45°$
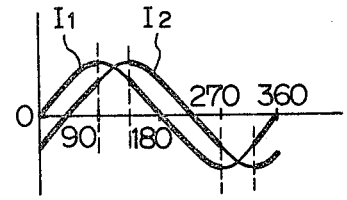
F I G. 6B    $\Delta\theta = 90°$
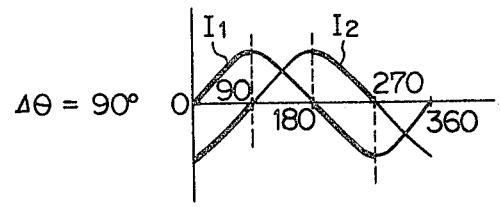
F I G. 6C    $90° < \Delta\theta \leq 180°$
$\Delta\theta = 135°$
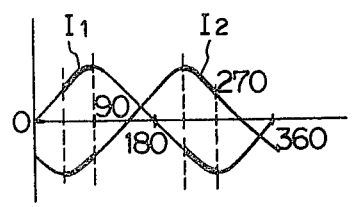

1: Contact chip
2: Conductor for outer surface
3: Conductor for inner surface

FIG_12
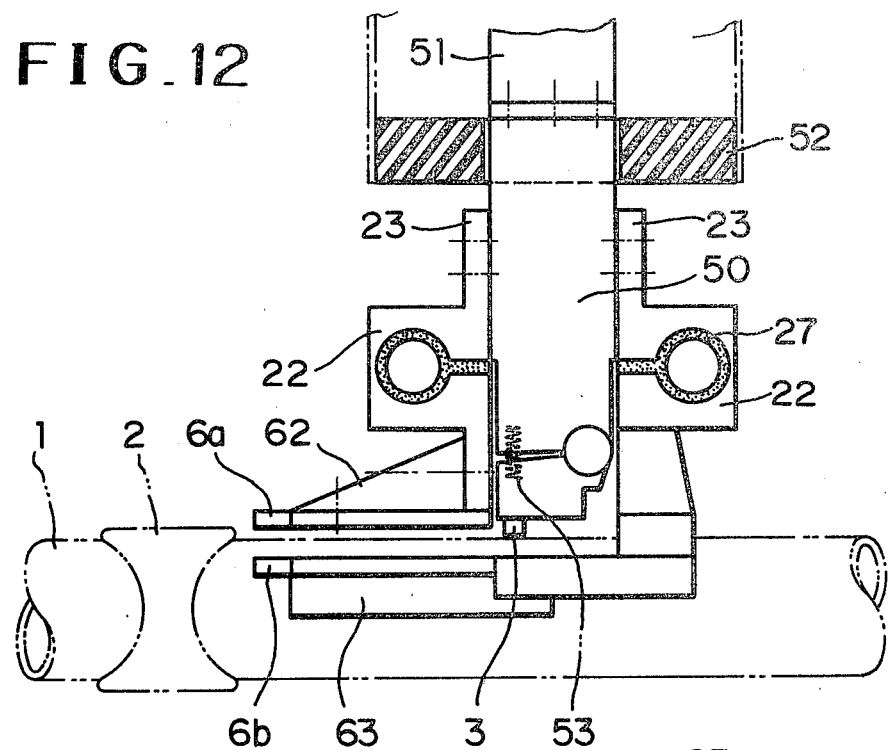
FIG_13
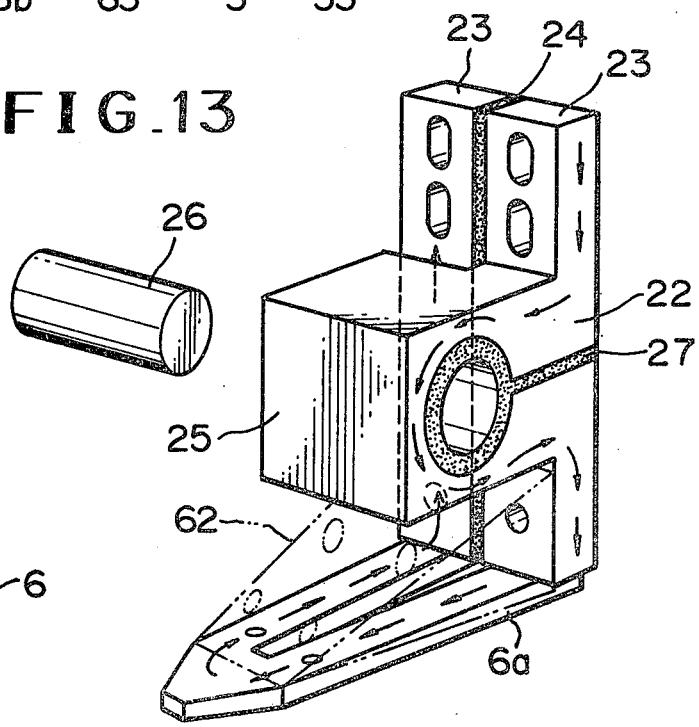
FIG_14
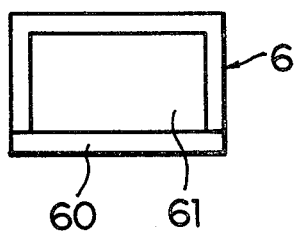

FIG_15A
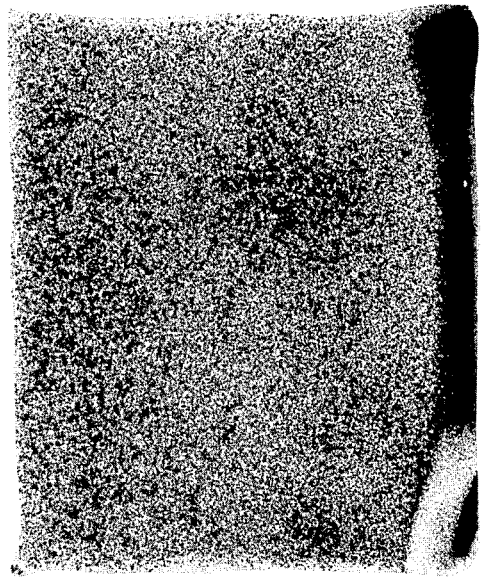
PRIOR ART
FIG_15B
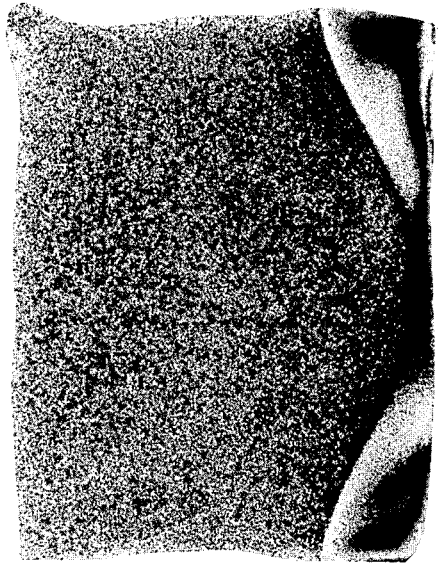

METHOD AND APPARATUS FOR MAKING AN ELECTRIC RESISTANCE WELDED TUBE

This is a continuation of application Ser. No. 120,866 filed Feb. 12, 1980 now abandoned.

BACKGROUND OF THE INVENTION

1. Field of the Invention

The present invention relates to a method and an apparatus for manufacturing electric resistance welded tubes.

2. Description of the Prior Art

A high-frequency resistance welding or a high-frequency induction welding are generally used for making electric resistance welded tubes.

In such weldings, a flow of current is concentrated to a rather narrow band in each of mating edges which are brought in an "angle of convergence" or so-called "Vee-angle". This phenomenon is often called "Skin effect". An inner and an outer edge of a hoop have higher temperatures than a center in thickness of tube has. The difference in temperatures between the inner and outer edges of the tube and the center in thickness is remarkable particularly on a heavy walled tube. Therefore, for heavy wall, even when the center of the mating surface are not heated to a forging temperature, the edges are tend to reach a melting temperature. When the edges are heated over the melting point, an oxide easily appears thereon which is one of causes for welding-defects. To avoid such welding-defects caused by an oxide, forging pressure is increased for urging out oxide from a welding-skin. The increase of the pressure is not desirable, because it causes the increase of metal flow angle and reduces the impact-characteristics. The increase of metal flow also deteriorate the performances of flattening test and flaring test. And, in addition, non-welded part is apt to appear near a surface of a weld line since the molten metal is not push out from the mating surfaces due to the insufficient pressure.

Consequently the prior art is inadequate for welding extremely heavy walled tube efficiently and limit the thickness to an extent of 12.7 mm. Submerged welding and TIG welding is often used for a heavier walled tube, but the yield efficiency of which are less than one-third of high-frequency welding. Recently in the production of a tube, electric welded tubes of 16 mm wall thickness are manufactured by lowering a line speed to an extent that the center of the mating surfaces are sufficiently heated through the heatdiffusion. In such art, a welded surface is easily oxidized to cause defects because of a longer allowable time for oxidation. In the production of a high-quality tube, e.g., a thick line pipe and etc., there may be utilized a gas-sealing on a welding-zone to prevent the welding-part from oxidation and producing defects. However in such art, yield efficiency is rather low because it needs to reduce a line-speed to control a temperature of the center in thickness of the plate to suit for butting.

SUMMARY OF THE INVENTION

An object of the invention is to provide a method and an apparatus of making an electric resistance welded tube where welding current-density at the mating surface of the Vee-angle part of the tube to be welded is made uniform.

Another object of the invention is to provide a method and an apparatus of making an electric resistance welded tube that can efficiently produce a high-quality tube.

A further object of the invention is to provide a met method and an apparatus of making an electric resistance welded tube that can produce a tube of heavy wall.

In the present invention, a high-frequency current having a phase difference not beyond $-90$ degree to 90 degree from a phase of welding current flows through a conductor which is located closely above and along the Vee-angle part of a tube to be welded, when heating the Vee-angle portion by high-frequency resistance.

The high-frequency current flowing through the conductor repulses the welding current through the Vee-angle part so that it does not concentrate to the upper and lower edges.

By this, the current-density and heating in the Vee-angle part are made uniform. Thus a high-quality electric welded tube is efficiently manufacture.

Other objects and advantages of the invention will be more readily apparent from the following detailed description with reference to the accompanying drawings.

BRIEF DESCRIPTION OF THE DRAWINGS

FIG. 1 is a graph showing a heat-distribution in a heating part;

FIG. 2 is an enlarged view showing a non-butted part of a tube;

FIG. 3 is an explanatory view showing the inventive method using a high frequency resistance welding;

FIGS. 4A and 4B are schematic views showing a current-density distribution;

FIG. 5 is an explanatory view showing an embodiment of the present invention;

FIGS. 6A, 6B and 6C are graphs showing a phase difference;

FIG. 12 is a side elevational view showing an inventive apparatus;

FIG. 13 is a perspective view showing a part of the apparatus;

FIG. 14 is a cross-sectional view showing a conductor; and

FIG. 15 is a sectional view showing a heated part of a hoop.

DETAILED DESCRIPTION OF THE INVENTION

Figure 7:
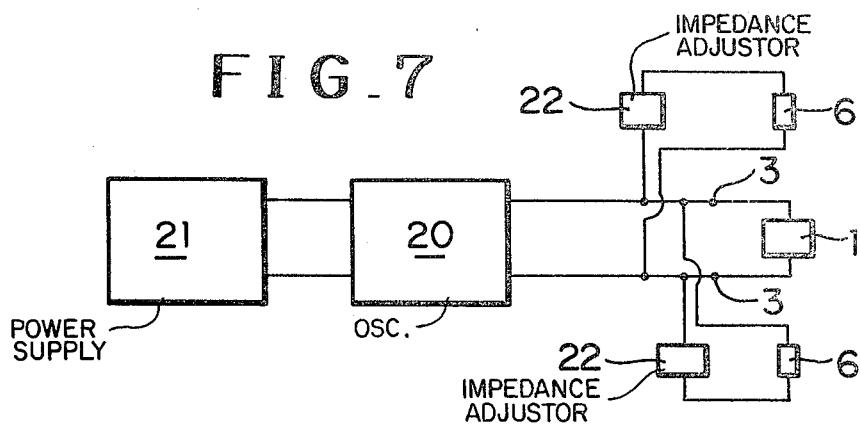
FIGS. 7—9 are schematic diagrams showing embodiments of the invention.

In a conventional weldings, there is a phenomenon that a skin at the end of the hoop is mainly heated due to concentration of the current on such skin. FIG. 1 shows heat-distribution at the moment when the mating surfaces meet to form Vee-angle, from which it can be realized that an inner and an outer parts of a tube have higher temperatures than a center in thickness of the tube. The difference in temperatures between the edges of hoop and the center in thickness is remarkable particularly on a heavy walled tube. Therefore, for heaby wall, even when the center of the mating surface are not heated to a forging temperature, the edges are tend to reach a melting temperature. When the edges are heated over the melting point, an oxide easily appears thereon which is one of causes for welding-defects. To avoid such welding-defects caused by an oxide, forging pressure is increased for urging out oxide from a welding-skin. The increase of the pressure is not desirable, because it causes the increase of metal flow angle and reduces impact-characteristics. The increase of metal flow also deteriorate the performances of flattening test and flaring test. And, in addition, non-welded part 10 as shown in FIG. 2 is apt to appear near a surface of a weld line since the molten metal is not push out from the mating surfaces due to the insufficient pressure.

When a tube 1 is heated by high-frequency heating by a sliding contact welding system, high-frequency current supplied from a contact chip 3 concentrates to and flow along a Vee part 4 to heat the part 4. The tube 1 heated is then butted between squeeze rolls 2. In the present invention, at time of heating, a high-frequency current having a phase difference of −90 degree to 90 degree from a phase of a high-frequency welding current is supplied closely above and along a surface of the Vee part 4. The above mentioned is achieved, for example, by setting a conductor 6 closely above and along the surface of the Vee part 4 and supplying the high-frequency current thereto.

Control of a distribution of current-density is substantially carried out by controlling an amount of the current to be fed to the conductor 6 by an impedance adjuster and the like, or a gap between the conductor 6 and the surface of the tube 1.

In the prior art, the welding current from the contact chip 3 concentrate to the outer and inner edges of the tube 1 owing to skin-effect as shown in FIG. 4A. In the present invention as shown in FIG. 4B, such concentration of the welding current to the edges of the hoop by skin-effect is suppressed due to a repulsive-action by the high-frequency current flowing through the conductor 6 and a very uniform current-density distribution is provided on the mating surfaces.

Various embodiments within the scope of this invention may be made. For example, the conductor 6 may be furnished only at one side above the outer or inner surface of the tube 1 with keeping some effects, while FIG. 4B shows that the conductor 6 is set above both the outer and inner surface of the tube 1 and the high-frequency current is fed both to the inner and the outer conductor. The current distribution is uniform on the Vee, where the conductor 6 is not set completely along the Vee 4. In FIG. 5, the conductor 6 is so shaped not to cover a adjacency of a point of V-convergence 7. With such shape of the conductor, the conductor 6 is protected from spattering around the point of V-convergence 7, since an excessive heating of edges is avoided through uniform heating of the surfaces.

Reference will be made to the phase difference between the welding current and the current to be supplied in the conductor 6.

FIG. 6 shows example of the phase difference ($\Delta\theta$) between the welding current (I1) and the current (I2) in the conductor 6. FIG. 6A shows the phase difference of 45° in the range of $0° \leq \Delta\theta < 90°$, in FIG. 6B $\Delta\theta = 90°$, and in FIG. 6C $\Delta\theta = 135°$ in the range of $90° < \Delta\theta \leq 180°$ (wherein I1 and I2 are graphed as I1=I2). Where signs of differentials of I1 (i1=dI1/dt) and I2 (i2=dI2/dt) are the same, there is the effect of making the distribution of current density uniform on the surfaces of the Vee part owing to the repulsion and the counter electromotive force caused by the high frequency current in the conductor. Where signs are in reverse, there is provided a contrary effect.

Consequently, the effect of making the distribution uniform can be estimated by comparing a value of integrations of time (t) at same signs with that at reverse signs. That is, in the case of FIG. 6A some effects are provided and no effects is produced in FIG. 6B and the contrary effect in FIG. 6C. So when the phase difference $\Delta\theta$ is 90° or −90° the effect is zero, and in the range of the phase difference $-90° < \Delta\theta < 90°$ some effects (maximum at $\Delta\theta = 0$) are obtained. It is practically preferred to keep the phase difference in the range of around $-45° < \Delta\theta < 45°$.

Apparatuses applied for a high-frequency resistance welding will be discussed for carrying out the inventive method with respect to FIG. 7—FIG. 9.

Ian apparatus shown in FIG. 7, the conductors 6, 6 are connected in parallel with a high-frequency oscillator 20 and provided with impedance adjustor 22, 22 respectively so that the distribution of the current of the outer and inner edges of the tube 1 to be welded may be separately controlled.

Figure 8:
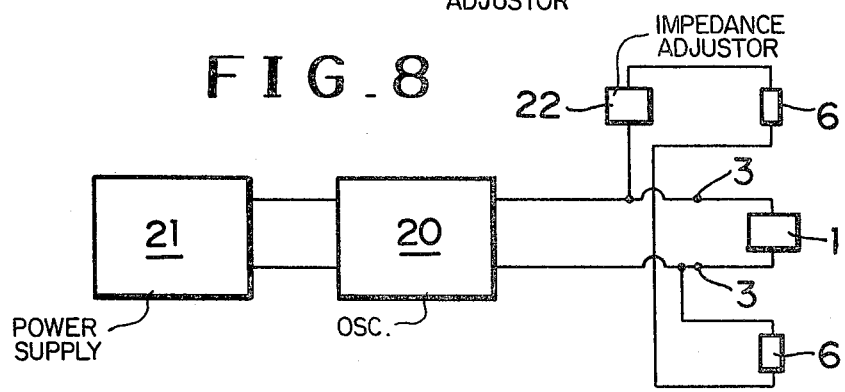
Figure 9:
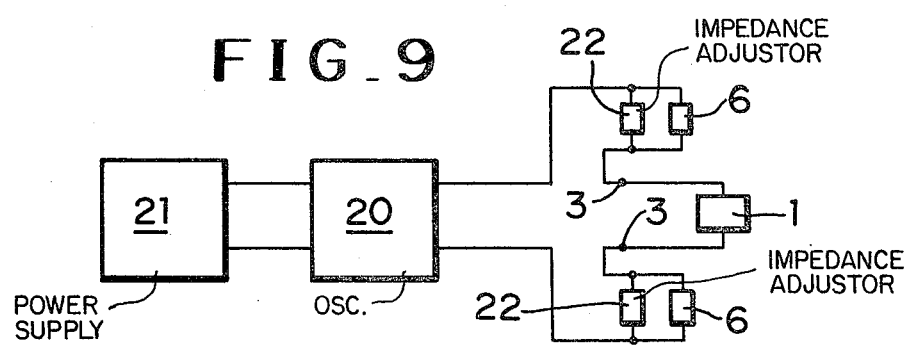

In an apparatus shown in FIG. 8, the conductors 6, 6 are in series, and connected in parallel with the contact chip to the oscillator 20. In an apparatus shown in FIG. 9, the conductors 6, 6 are connected in series with the contact chip. The impedance adjuster preferably comprises a coil and a ferrite core going inward and outward therein to be compact and easy to operate. A capacitor and a resistor may also substantially be used.

When the impedance adjuster is not employed, a gap between the conductor 6 and the tube 1 is adjusted to control the impedance (capacitance). In the case of gap control, a fixed capacitor or a inductor may be connected for the easy control of impedance. Without the device for controlling the impedance an apparatus shown in FIG. 9 should be most efficiently supplied.

Figure 10:
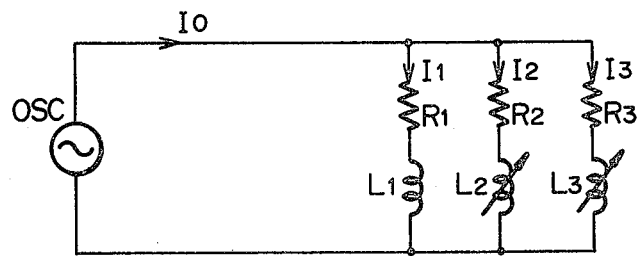
FIG. 10 is a circuit diagram showing an equibalent circuit to the circuit shown in FIG. 7.

In the above apparatuses, the high-frequency oscillator 20 for welding are used in common for controlling the distribution. In such usage, there arises the phase difference between the welding current and the current in the inductor (I2, I6 in FIG. 10). FIG. 10 shows a equivalent circuit of the apparatus. In FIG. 10, $R_1$, $R_2$ and $R_3$ indicate resistances of the conductor and $R_1$ indicates resistance of the Vee part with consideration of a contact resistance and the skin-effect. $L_1$, $L_2$ and $L_3$ are inductances of the conductor and $L_1$ is inductance of the Vee part with consideration of capacitance and mutual inductance due to other wires.
Wherein $$\tan\theta_1 = L_1\omega/R_1, \tan\theta_2 = L_2\omega/R_2, \tan\theta_3 = L_3\omega/R_3$$

Thus the phase difference $$\theta_1 - \theta_2 = \theta_1 - \theta_3 \; (\because \theta_2 = \theta_3)$$

$$= \arctan\left(\frac{L_1\omega}{R_1}\right) - \arctan\left(\frac{L_2\omega}{R_2}\right)$$

$$= \arctan\left(\frac{L_1\omega}{R_1}\right) - \arctan\left(\frac{L_3\omega}{R_3}\right)$$

Figure 11:
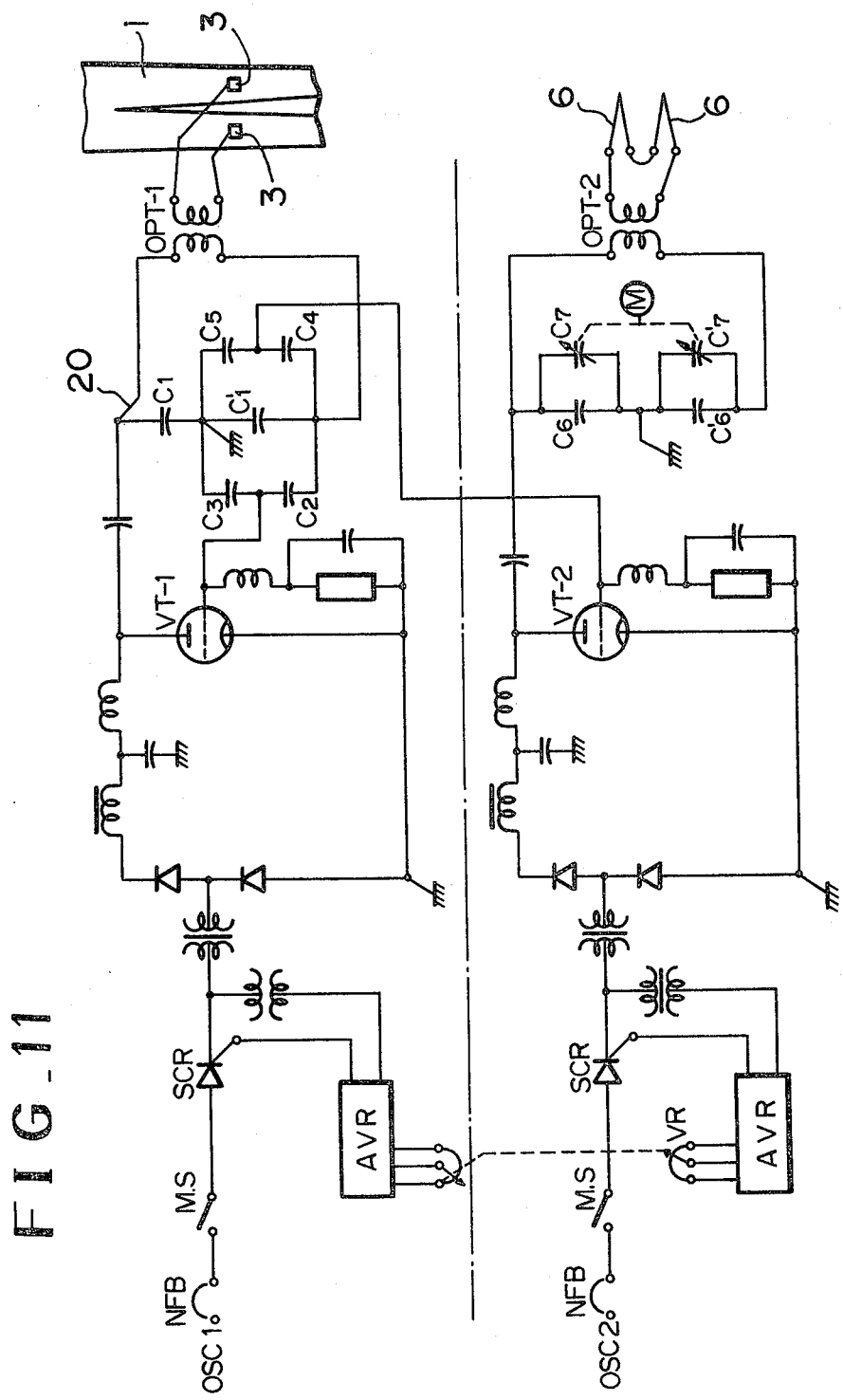
FIG. 11 is a circuit diagram showing another embodiment of the invention.

Another high-frequency oscillator synchronized with the oscillator for welding is necessary for eliminating such phase differences. FIG. 11 shows an embodiment of the synchronized oscillator, where the voltage divided by capacitors C4 and C5 of the oscillator (OSC1)

for welding is used for biasing grid of an oscillator valve (VT-2) of an oscillator (OSC2) for the conductor so that a parallel resonance frequency of C6, C7, C'6, C'7 of OSC2 and an output-transformer (OPT-2) may be synchronised with the oscillation frequency of OSC1, and C7, C'7 are so variable as to be able to adjust slightly a tuning-point.

By employing the above oscillator, following effects are obtained,

1. It is possible to suppress the phase difference to the minimum and to most efficiently utilize the electric power supplied to the conductor for controlling the distribution of current density at the Vee part.

2. The control for the current-density may be carried out by adjusting an electric power of OSC2, i.e., a plate voltage, keeping the prescribed gap.

3. Even when the gap is set large for an easy-operation thereof, the same effects are obtained subject to increasing an electric power on OSC2.

4. Impedance adjuster is not needed for controlling the current density.

FIG. 12, FIG. 13 and FIG. 14 show an embodiment of an apparatus relating to a high frequency resistance welding for carrying out the present invention. Contact shoes 50 are connected with lead lines 51 of the oscillator at upper ends thereof and fixed on an insulator 52 made of bakelite and etc. The contact chips 3 are fixed on the lower ends of the contact shoes 50. The ends of the contact shoes 50 including the contact chips 3 are devided to vertically turn for adjusting a location of the chips with a spring 53. The contact shoes 50 are arranged along the width of the tube, between which an insulator is set.

According to the proposed apparatus, the conductors 6a, 6b are further provided. The conductors are shaped in V corresponding to the Vee-angle. A conductor 6a is set closely above and along the Vee part of the outer-side of the tube. The other conductor 6b is also set at the inner side of the tube. The conductors shown in FIG. 14 are shaped in a square tube in cross-section, where one side is made of a copper conductive bar and the other three sides are made of inconductive materials. Cooling-liquid 61 passes through the hole. With such construction of the conductor, an efficiency for controlling the distribution of the current density are superior. The conductors 6a, 6b are reinforced respectively by ribs 62, 63. Through experiment by the inventors, it is most effective to keep the gap between the conductors and the surface of the tube as closely as possible. It is preferred to provide a device which keeps the gap 2—4 mm and to cover the conductors with a glass-tape or a celamic coating and the like to avoid wears and damages thereof.

The apparatus incorporates the electric circuit shown in FIG. 7 to feed the high-frequency current to the conductors 6a, 6b. That is, each end of the V-figured conductors 6a, 6b is connected with the oscillator 20 through copper conductive bar 23 and the contact shoe. The bars 23, 23 also mechanically fixes the conductors 6a, 6b to the contact shoe. The bars 23, 23 are fastened to the contact shoe 50 by bolts and nuts, etc., at the upper part thereof and at the lower end connected with the end of the V-figured conductor which is supported thereby. The bars are in parallel each other and insulated by an insulator 24 provided therebetween. An impedance adjuster 22 consists of a one-turn coil 25 integrated with the bar 23 and a ferrite core 26 going forward and backward therein. The coil 25 is larger than the bar in width to improve an efficiency for adjusting impedance. An inner part of the coil 25 and a slit formed in the bar 23 are coated with an insulator 27 made of Teflon and the like. FIG. 13 shows just the constructions of conductive bars and the adjuster applied to the conductor 6a for the outer part of the tube 1, and the constructions of bars and the impedance adjuster applied to the conductor 6b for the inner part of the tube 1 is about the same as the former.

Since the lower end of the bar 23 for the conductor 6b, is below the Vee part of the tube, it is needed to consider a width of the bar 23.

With the above mentioned apparatus, it is possible to adjust impedance by the ferrite core's going forward and backward to make the distribution of the current density of the V-throat uniform. The apparatus is advantageously simple and easy in operation, since the impedance adjuster 22 is set about on a center of the contact shoe 50.

The above described apparatus can be applied for the high-frequency induction welding with some changes.

EXAMPLE

A coil of SS41 of 14.2 mm thickness was welded by the inventive method and the conventional method.

A high-frequency thermatool VT280 (400 KHZ) was used under conditions of 247 KVA and a tube of outer diameter of 20 inches (508 mm) was welded in a speed of 11.8 m/min.

FIG. 15A shows a heat affected zone (HAZ) of the inventive method and FIG. 15B shows that of the conventional method.

It is apparently realized that the inventive method uniformly heats the material in a direction of thickness.

The pressing roll needed the squeezing value of 3 mm in the conventional method, and sufficiently 2 mm in the inventive method. The tube made by the inventive method shows no nonbutted part and superior performances in an impact characteristic, a flattening test and an flareing test.

What we claim is:

1. A method of making a heavy wall welded tube from a generally tubular metal member having a pair of longitudinally directed edges of substantial thickness which are to be welded together, comprising:
   flowing a high-frequency electric welding current in a Vee part formed by the longitudinally directed edges of the tube to be welded;
   locating at least one conductor closely adjacent to and along a surface of said Vee part of said tube to be welded, said at least one conductor being spaced from said tube;
   supplying to said at least one conductor a high-frequency current whose phase is substantially the same as the phase of the high-frequency welding current flowing in said Vee part of said tube; and
   controlling the distribution of current density in said Vee part of said tube to be welded by means of said at least one conductor to obtain a substantially uniform distribution of current density, and substantially uniform heating of said tubular metal member, in the thickness direction of said Vee part of said tube at least at the portions thereof which are being welded together.

2. The method of claim 1, comprising providing two of said conductors, one conductor being located closely adjacent to and spaced from an inner surface of said tube and the other being located closely adjacent to and spaced from an outer surface of said tube at said Vee part of said tube.

3. The method of claim 1, wherein said at least one conductor is located closely adjacent to and spaced from the inner surface of said tube at said Vee part of said tube.

4. The method of claim 1, wherein said at least one conductor is located closely adjacent to and spaced from the outer surface of said tube at said Vee part of said tube.

5. The method of claim 1 wherein said at least one conductor is not located above a point of V-convergence of said Vee part of said tube.

6. The method of any one of claims 1, 2, 3, 4 or 5, wherein said controlling step comprises controlling the amount of high-frequency current supplied to said at least one conductor to control the distribution of the current density in the thickness direction in said Vee part of said tube.

7. The method of any one of claims 1, 2, 3, 4 or 5, wherein said controlling step comprises controlling the gap between said at least one conductor and said surface of said tube to control the distribution of the current density in the thickness direction in said Vee part of said tube.

8. Apparatus for making a heavy wall welded tube from a generally tubular metal member having a pair of longitudinally directed edges of substantial thickness which are to be welded together by high-frequency welding, comprising:
  means for supplying a high frequency welding current and for applying said welding current to a Vee part formed by the longitudinally directed edges of said tube for heating and welding said edges together at least in the vicinity of said Vee part;
  at least one conductor mounted closely spaced from and along a surface of said Vee part of said tube which is to be heated and welded by said welding current;
  means for supplying to said at least one conductor a high-frequency current having substantially the same phase as the phase of the high frequency welding current flowing in said Vee part of said tube, and
  means coupled to said at least one conductor for controlling the current density distribution in said Vee part of said tube to be welded by means of at least one conductor to obtain a substantially uniform distribution of current density and substantially uniform heating of said tubular metal member in the thickness direction of said Vee part of said tube at least at the portions thereof which are welded together.

9. The apparatus of claim 8, wherein said at least one conductor is mounted closely adjacent to, but spaced from, the inner surface of said tube at said Vee part of said tube.

10. The apparatus of claim 8, wherein said at least one conductor is mounted closely adjacent to, but spaced from, the outer surface of said tube at said Vee part of said tube.

11. The apparatus of claim 8, including means for maintaining the gap between said at least one conductor and the tube to be welded at a prescribed value.

12. The apparatus of claim 8, wherein said at least one conductor has a coating thereon for protecting same.

13. The apparatus of claim 8, wherein said at least one conductor is shaped as a square tube through which a cooling fluid flows.

14. The apparatus of claim 8, wherein said at least one conductor comprises respective conductors connected in series with each other and which are respectively located closely spaced from both an inner surface and an outer surface of said Vee part of said tube to be heated and welded.

15. The apparatus of claim 8, wherein said means for supplying said high-frequency current to said at least one conductor is coupled in parallel with said means for supplying said high-frequency welding current.

16. The apparatus of claim 8, wherein said controlling means comprises an impedance adjuster for adjusting the phase of high-frequency current to be supplied to said at least one conductor.

17. The apparatus of claim 16, wherein said impedance adjuster comprises a coil and a ferrite core which is movable inward and outward within said coil.

18. The apparatus of claim 8, comprising a contact shoe adjacent said tube, and wherein said at least one conductor is electrically and mechanically connected with said contact shoe through a conductive bar.

19. The apparatus of claim 18, wherein said controlling means comprises a coil integrated with said conductive bar and ferrite core which is movable forward and backward within said coil.

20. The apparatus of claim 8, comprising respective conductors mounted closely adjacent to, but spaced from, both an inner surface and an outer surface, respectively, of said Vee part of said tube to be welded.

21. The apparatus of claim 20, wherein said controlling means comprises an impedance adjuster, and wherein said conductor adjacent to the inner surface of the tube, said conductor adjacent to the outer surface of the tube and said impedance adjuster are connected in series with each other and they are connected with said high-frequency current supply means in parallel with the tube to be welded.

22. The apparatus of claim 20, wherein said conductors are connected in parallel with a high-frequency oscillator for supplying welding current, and wherein said controlling means comprises respective impedance adjusters connected in series with said conductors for adjusting the phase of high-frequency current to be supplied to said conductors.

23. The apparatus of claim 22, wherein said controlling means includes means for controlling the gap between at least one of said conductors and the tube to be welded for rendering said current density distribution substantially uniform.

24. The apparatus of claim 20, wherein said conductor adjacent to the inner surface of the tube, said conductor adjacent to the outer surface of the tube and the tube to be welded are connected with each other in series.

25. The apparatus of claim 24, wherein said controlling means includes respective impedance adjusters connected in parallel with the respective conductors for adjusting the phase of high-frequency current to be supplied to said conductors.

* * * * *

UNITED STATES PATENT AND TRADEMARK OFFICE
CERTIFICATE OF CORRECTION

PATENT NO. : 4,456,803
DATED : June 26, 1984
INVENTOR(S) : Fumio Kaneda et al.

It is certified that error appears in the above-identified patent and that said Letters Patent is hereby corrected as shown below:

Column 4, line 15, "Ian" should read -- In an --.

Column 4, line 35, "supplied" should read -- applied --.

Signed and Sealed this

Ninth Day of April 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,456,803
DATED : June 26, 1984
INVENTOR(S) : Fumio KANEDA, et al

It is certified that error appears in the above-identified patent and that said Letters Patent is hereby corrected as shown below:

COLUMN 2, lines 17-22 should read as follows --Thus the current-density and heating in the Vee-angle part are made uniform and a high-quality electric welded tube is efficiently manufactured--;

COLUMN 2, lines 49-50 should read as follows --Fig. 15A and 15B respectively show the heat affected zone of a product made by the present invention and of a conventionally made product.--;

COLUMN 3, line 11 should read --Referring to Fig. 2 and 3, when a tube 1 is heated by high-frequency heating by--;

COLUMN 3, line 56 should read --Figs. 6A-6C show examples of the phase difference ($\Delta\theta$)--;

UNITED STATES PATENT AND TRADEMARK OFFICE
CERTIFICATE OF CORRECTION

PATENT NO. : 4,456,803
DATED : June 26, 1984
INVENTOR(S) : Fumio KANEDA, et al

It is certified that error appears in the above-identified patent and that said Letters Patent is hereby corrected as shown below:

COLUMN 4, line 12-14 should read --Apparatuses applied for carrying out the invention will be described with respect to Figs. 7, 8 and 9.--;

COLUMN 4, line 15, before "apparatus" change "Ian" to --In an--;

COLUMN 4, line 17, after "provided with" change line to read --respective impedance adjusters 22, 22 so--;

COLUMN 4, lines 18-20 should read --that the distribution of the current of the outer and inner edges of the tube 1 to be welded may be separately controlled. Oscillator 20 is powered by a power supply 21.--;

COLUMN 4, line 21, after "In" change "an" to --the--;

UNITED STATES PATENT AND TRADEMARK OFFICE
CERTIFICATE OF CORRECTION

PATENT NO.   : 4,456,803
DATED        : June 26, 1984
INVENTOR(S)  : Fumio KANEDA, et al It is certified that error appears in the above-identified patent and that said Letters Patent is hereby corrected as shown below:

COLUMN 4, line 25, change "contact chip" to --contact chips 3,3--;
    after "impedance" change "adjuster" to --adjusters 22 each--;

COLUMN 4, line 35, the word "supplied" should read --applied--;

COLUMN 4, line 39, after "difference" insert --Θ--;

COLUMN 4, line 40, after "I2" change "I6" to --IO--.

This certificate will supersede Certificate of Correction issued April 9, 1985.

Signed and Sealed this

Twenty-fourth Day of September 1985

[SEAL]

Attest:

Attesting Officer

DONALD J. QUIGG

Commissioner of Patents and Trademarks—Designate